United States Patent [19]

Andrews et al.

[11] Patent Number: 5,768,564
[45] Date of Patent: Jun. 16, 1998

[54] METHOD AND APPARATUS FOR TRANSLATING SOURCE CODE FROM ONE HIGH-LEVEL COMPUTER LANGUAGE TO ANOTHER

[75] Inventors: Kristy A. Andrews, Palo Alto; Paul Del Vigna; Mark E. Molloy, both of San Jose, all of Calif.

[73] Assignee: Tandem Computers Incorporated, Del.

[21] Appl. No.: 319,682

[22] Filed: Oct. 7, 1994

[51] Int. Cl.$^6$ ............................................. G06F 9/44
[52] U.S. Cl. .................... 395/500; 395/650; 395/685; 395/701; 395/705; 395/707; 395/708; 707/101; 364/280.4; 364/DIG. 1
[58] Field of Search ............................ 395/500, 700, 395/600, 708, 421.08, 800, 421.04, 611, 613, 650, 601, 680, 685, 701, 702, 703, 705, 707; 707/101, 103

[56] References Cited

U.S. PATENT DOCUMENTS

| | | | |
|---|---|---|---|
| 4,599,691 | 7/1986 | Sakaki et al. | 364/419 |
| 4,667,290 | 5/1987 | Goss et al. | 395/700 |
| 4,794,528 | 12/1988 | Hirose et al. | 364/300 |
| 4,868,743 | 9/1989 | Nishio | 304/200 |
| 4,956,809 | 9/1990 | George et al. | 395/600 |
| 4,989,132 | 1/1991 | Mellander et al. | 395/700 |
| 5,151,697 | 9/1992 | Bunton | 341/51 |
| 5,173,853 | 12/1992 | Kelly et al. | 364/419 |
| 5,239,663 | 8/1993 | Faudemay et al. | 395/800 |
| 5,276,874 | 1/1994 | Thomson | 395/600 |
| 5,367,683 | 11/1994 | Brett | 395/700 |
| 5,384,568 | 1/1995 | Grinberg et al. | 341/51 |
| 5,392,390 | 2/1995 | Crozier | 395/144 |

FOREIGN PATENT DOCUMENTS

| | | | |
|---|---|---|---|
| 0 361 737 A3 | 4/1990 | European Pat. Off. | G06F 9/44 |
| 0 583 117 A2 | 2/1994 | European Pat. Off. | 9/44 |

OTHER PUBLICATIONS

"Project Plan for pTAL to C++ Translator," Jul. 6, 1992, Reasoning Systems Inc.

Platoff, Michael, et al. "An Integrated Program Representation and Toolkit for the Maintenance of C Programs", *Proceedings, Conference on Software Maintenance Sorrento*, Oct. 15–17, 1991, No. Oct. 15, 1991, Institute of Electrical and Electronics Engineers, 129–137.

Ladd, D.A., et al. "A*: a Language for Implementing Language Processors", *Proceedings of the International Conference on Computer Languages, Toulouse*, May 16–19, 1994, No. Conf. 5, May 16, 1994, Institute of Electrical and Electronics Engineers, 1–10.

Albrecht, P., et al., "Source-to-Source Translation: Ada to Pascal and Pascal to Ada," *Proc. of the ACM Sigplan Symp. on the Ada Prog. Lang.*, Sigplan Notices (Nov. 15, 1980) ACM 0–89791–0303/80/1200/0183, pp. 1–12.

Atkinson, R., et al., "Experiences Creating a Portable Cedar," Xerox PARC, CSL–89–8 (Jun. 1989), ©1989 Assoc. of Computing Machinery, pp. 1–12.

(List continued on next page.)

*Primary Examiner*—Kevin J. Teska
*Assistant Examiner*—Thai Phan
*Attorney, Agent, or Firm*—Townsend and Townsend and Crew LLP

[57] ABSTRACT

A method, system, apparatus, and program for translating one computer language to another using doubly-rooted tree data structures. A doubly-rooted tree is the combination of two sets of hierarchically related objects sharing a common set of leaves. An N-rooted tree is also described. When a doubly-rooted tree is constructed in the specified manner and then translated to a second doubly-rooted tree, source language code is transformed into target language code. In addition, the translation preserves preprocessor characteristics of the source language code including macros, conditionally compiled regions of code, source inclusion statements, and comments.

3 Claims, 9 Drawing Sheets

OTHER PUBLICATIONS

Bartlett, J., "Scheme -7C a Portable Scheme-to-C Compiler," ©Digital Equipment Corp. (1989), pp. 1–25.

Lemkin, P., Psail: Sail to C, *Computer Language* (Aug. 1985), pp. 39–45.

Moynihan, V., et al., "The Design and Implementation of a High-Level Language Converter," *Software Practice and Experience*, vol. 21 (4) (Apr. 1991), ©1991, J. Wiley & Sons, pp. 391–400.

Waters, R., "Program Translation via Abstraction and Reimplementation," *IEEE Translations on Software Engineering*, vol. 14, (8) (Aug. 1988), pp. 1207–1228.

Weiner, J., et al., "A Piggy-back Compiler for Prolog," ©1988 ACM 0-89791-269-1/88/0006/0288, pp. 288–296.

"SA-Sculptor/TAL TAL to C Conversion from Tandem TAL to ANSI C," prepared by Systems Automation, Inc., ©Systems Automation, Inc. (1992–93), p. 10.

"Recommendations for TAL to Tandem C Translation," prepared by Software Engineering and Enhancement Center for Tandem Computers, Inc. (Dec. 7, 1989), p. 55.

Project Plan for pTAL to C++ Translator, ©Tandem Computers Inc. (1992), 64 pages.

Minor, S., "Interacting with Structured-Oriented Editors," *Inter. J. of Man–Machine Studies* (1992) 37, pp. 299–418.

Ohsawa, Y., et al., "A new tree type data structure with homogeneous nodes suitable for a very large spacial database," *Data Eng.* (1990), 6th Inter. Conf., pp. 296–303.

Jiang, J., "Implementing the Patricia data structure for compression algorithms with finite-size dictionaries," *Data Transmission*, IEEE Conf., pp. 123–127.

Softfare II, a second conference on software development tools, techniques and alternatives (cat No. 85ch2231-9) SF, Dec. 1995 ISBN 0-89791-173-3, 1985, Washington, D.C., IEEE Computer Soc. Press USA, pp. 199–206.

Wang, et al., "A Tool for Tree Pattern Matching", *Proc. of the 1991 IEEE Int. Conf. on Tools for Artificial Intelligence*, TAI '91, (Cat 91CH3054-4) San Jose, Calif., Nov. 1991 ISBN 0-8186-2300-4, 1991 pp. 436–444 XP 000333437.

Micallef, et al., "Support for Algorithms for incremental attribute evaluation of asynchronous subtree replacements," IEEE transactions on software engineering, vol. 19, No. 3, Mar. 1993 NY, pp. 231–252 XP 000382081.

Cardenas, et al., "Doubly-chained tree data base organization-analysis and design strategies," *Computer Journal*, vol. 20, No. 1, Feb. 1977 ISSN, pp. 15–26.

METHOD AND APPARATUS FOR TRANSLATING SOURCE CODE FROM ONE HIGH-LEVEL COMPUTER LANGUAGE TO ANOTHER

BACKGROUND OF THE INVENTION

This invention relates to automated translation between high-level computer programming languages.

This invention relates particularly to improved preservation in a target high-level language of preprocessor characteristics (such as macros, source file inclusion structure, and commentary) contained in a source high-level language. A feature of this invention is that preprocessor characteristics need not necessarily be processed by a preprocessor.

High-level computer languages enable computer programmers to communicate with computers. Statements programmers write in a computer language form a computer program which in turn instructs a computer to perform a set of tasks. "Compilation" is the manner in which high-level computer language programs are converted into instructions, generally called machine code, which the computer can understand and execute. A compiler is a computer program which performs this translation.

In general, each brand of computer understands a different set of machine code instructions. Therefore, a different compiler must exist for each computer to translate a high-level computer language. Because compilers for every high-level computer language do not exist on every brand of computer, not every program can execute on every machine. Programmers can only write programs in the languages for which compilers exist for their target computers.

Nonetheless, it is highly desirable to have a single computer program run on as many brands of computers as possible. Application programs are typically complex and difficult to write; rewriting programs in multiple languages to run on multiple brands of computers is impractical. Likewise, compilers are difficult to write; providing them for every language for every brand of computer is equally impractical. One way of addressing these problems has been the development of well known, widely used, standardized high-level languages. Compilers for these languages are available for a wide variety of computers.

The development of standardized languages has not been a complete solution. There exist numerous high-level languages, and many large programs written in them, which are exotic, highly specialized, little used, obsolete, or designed for specific computers. Many computers do not have compilers available for these languages.

Because many high-level computer languages, whether or not they are standardized, cannot be compiled on every computer, programs have to be translated to other languages. While translation can be done by hand, it is a laborious, time consuming, and expensive process prone to error. To address this problem, automatic translators have been and continue to be developed to translate programs written in one high-level language to another.

Automatic translators may be used in either of two distinct strategies to solve the problem of an unavailable compiler for a particular language on a particular computer. First, programmers may continue to write and maintain programs in the original source language. The translator converts these programs into intermediate code in a target language. An available compiler for the target language then converts this intermediate code into machine code which the target computer can understand. Although the target language is usually a standard widely available language, the translator does not have to produce readable or maintainable source code.

The second strategy requires a translator to produce readable and maintainable code. Programmers going this route want to abandon the original language in favor of the target. Building this type of translator is a more difficult task and is the focus of this invention.

Prior art attempts to build translators which produce readable code have had differing goals and various levels of success. Syntax of one high-level language has been successfully transformed into syntax of another high-level language. Some translators have produced attractively formatted target code. While source code comments have been migrated to target code, their placement has not always been optimal. Translators have also attempted to transform the style of programs to make them more readable. Others have used knowledge-based systems to extract the meaning of the source program and rewrite it in the target language.

However, prior art translators have universally failed adequately to preserve programming constructs generally known as preprocessor characteristics. Many high-level languages include a preprocessor language separate from but coexisting with the language itself. Characteristics (which are also herein referred to as invocation expressions) of the preprocessor language may include a conditional compilation mechanism, a macro mechanism, a source inclusion mechanism, a variety of compiler directives, and a comment mechanism. At the risk of oversimplification, the preprocessor allows programmers to use shorthand expressions for longer constructs. Thus, invoking the shorthand expression triggers a text substitution when the source code is run through the preprocessor.

The failure of translators to handle adequately preprocessor characteristics is a well known problem. Experts in the field, when considering how to replace a source language macro definition with a target language macro definition, have stated: "We do not know of a general, fully automatic mechanism for achieving this replacement." Two suggestions have been made:

Attempt to parse macro bodies outside of their context of use, with the hope that some well-formed and complete source language constructs will translate them correctly.

Recognize common sequences of tokens in macro bodies via pattern matching.

The former is not a general solution because languages may make no restrictions for using macros, and such restrictions, in any event, would make macros susceptible to semantic errors. The latter suggestion would only work in special cases.

SUMMARY OF THE INVENTION

A general object of the present invention is to provide a method and apparatus for automatically translating the source code from one high level computer language to the source code of another language.

A specific object of the present invention is to provide a method of translating code from a source computer language to a target while preserving the preprocessor characteristics of the code as written in the source language.

Another object of the present invention is to provide a data structure useful for automated translation, whether it be from one computer language to another or from a natural language to another. The data structure, termed a doubly-rooted tree, combines two prior art tree data structures so that their leaves coincide. By creating and filling the doubly-rooted tree in a specified manner, and then translating it to a second doubly-rooted tree, preprocessor characteristics of a computer language may be preserved while translating other statements, constructs, and expressions.

A doubly-rooted tree may serve as the basis for more complex data structures. For example, additional trees may be joined at the leaves to form an N-rooted tree. Such a linked set of trees has computer database applications.

Other and further objects of the present invention will be apparent from the following description and claims and are illustrated in the accompanying drawings which, by way of illustration, show preferred embodiments of the present invention and the principles thereof and what are now considered to be the best mode contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

In the Drawings:

FIG. 3A is a block diagram depicting the syntax tree of FIG. 3 where the source language is FORTRAN and the source statment is $Z=X+Y$.

FIG. 4A is a block diagram depicting the source syntax tree and associated virtual source of FIG. 4 where the source language is FORTRAN and the source statement is $Z=X+Y$.

DETAILED DESCRIPTION OF THE INVENTION

Figure 1:
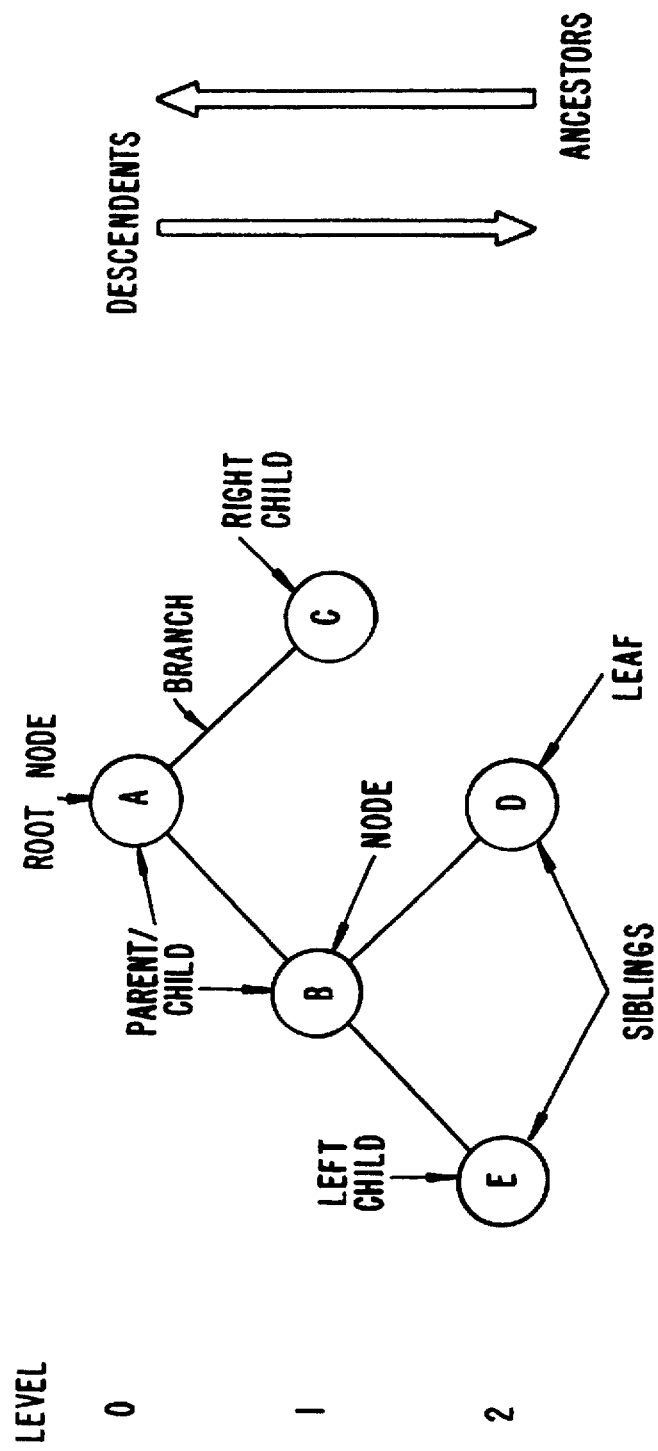
FIG. 1 depicts a prior art tree structure.

This invention implements a strategy for translating legacy software to a different high-level programming language. This translation process preserves text preprocessor mechanisms such as macros, conditionally compiled regions of code, and source inclusion. This section specifically discusses the design of the Rosetta Translator, which implements this strategy. The Rosetta Translator translates from Tandem's portable Transaction Application Language (pTAL) to C++.

Source-To-Source Translation

Source-to-source translation to a standard, portable, and widely-available language, such as C, has been shown to be an excellent means of making exotic languages available on many platforms [2, 3, 4, 9]. Programmers continue to write and maintain programs in the original source language, and use the translated source as intermediate code. These translators need not address the problems inherent in producing readable and maintainable code: preserving macro definitions and program structure, and retaining meaningful naming, comment placement, and format.

Attempts have been made to implement source-to-source translators that transform the style of a program, thus rendering it more readable, or to extract the meaning of a program and use a knowledge-based system to express the program in a higher-level language [8]. We were unable to apply such techniques to our advantage.

pTAL, C++, and many high-level programming languages consist of a preprocessor language separate from but coexisting with a high-level language. The preprocessor language might include a conditional compilation mechanism, a macro mechanism, a source inclusion mechanism, a variety of compiler directives, and a comment mechanism. The preprocessor language need not be implemented by a separate preprocessor. The Rosetta Translator not only translates high-level language constructs but also preprocessor constructs; preserving the latter is a difficult but important part of producing readable and maintainable code.

While some published accounts describe translators that produce readable high-level code [1, 5], we have encountered no published accounts of experience with translators which produce readable and maintainable code and which preserve preprocessor mechanisms.

Languages

The source language, pTAL, is a proprietary block-structured systems programming language, originally derived from Algol-60. The vast majority of Tandem's system code was written in pTAL or its precursor, TAL. The Rosetta Translator uses pTAL as its source language instead of TAL because pTAL excludes various architecture-specific TAL features that are not available in standard programming languages, such as assembly language code statements and arbitrary register manipulation. All TAL code will eventually migrate to pTAL.

The translated code is dominated by the C language subset of C++, but includes occasional constructs specific to C++. The Rosetta Translator does not generate object-oriented code. C++ is a much better target language than C for a number of reasons, including strong type checking and easy emulation of several important pTAL language constructs, and the opportunity to use the object-oriented paradigm in the future. The ideas presented here apply to other programming languages containing preprocessor mechanisms that one would have a practical need to translate.

Concepts

The following concepts are key to this description of a method for preserving macros.

Virtual Source

A program's virtual source is a stream of tokens that a compiler parses to create a syntax tree representing that program.

Virtual Source Production Mechanisms

Virtual source production mechanisms are used by a scanner or preprocessor to create virtual source. Virtual source production mechanisms available in pTAL and C++ are:

- source inclusion of files
- macro expansion
- macro formal parameter substitution A virtual source production mechanism can appear anywhere in a source file and yield any portion of a syntactic construct; it need not honor syntactic construct boundaries. Virtual source does not necessarily exist in textual form in any single source file; the token stream is created by a series of source inclusions, macro expansions, and macro formal parameter substitutions.

The Rosetta Translator translates virtual source production mechanisms as well as high-level language constructs. It does not merely expand the virtual source with a preprocessor before performing its translation. The macro that the programmer knew and loved appears in the translated code, and means the same thing. The file structure of the program is also preserved.

Fragment

A "fragment" represents the result of an invocation of a virtual source production mechanism: source file inclusion, macro expansion, or macro formal parameter substitution. Each fragment is linked to the tokens that make up its invocation syntax: a macro formal parameter, a macro invocation (including the parameter list), or a token representing a source inclusion directive. Each fragment contains the tokens composing its expansion: a macro actual parameter, a macro body, or an included file. The tokens composing the invocation syntax are themselves contained in another fragment, which represents its context of use. For example, a macro invocation can be embedded in a macro body, or in the main program file.

Fragments can be divided into "partitions" by compiler directives. Because some compiler directives affect the semantics of the program, and some determine what text is scanned (for example, conditional compilation directives), directive boundaries must be preserved.

Partitions are bounded by:

- compiler directives
- beginning and end of macro bodies in a macro definition
- beginning and end of a file The details of preserving partition boundaries are not discussed in this document.

Fragment Tree

A fragment tree represents each source inclusion, macro expansion, and macro actual parameter substitution that was employed to create the virtual source.

Static Fragments

A static fragment is a mold from which fragments are made; each fragment is an instance of a static fragment. A source file is a static fragment, and it may contain nested static fragments. The Rosetta Translator pieces together textual representations of C++ fragments to form C++ output files, fitting a textual representation of a macro body, for example, into its definition. Because the Rosetta Translator's design requires that each source language macro maps to exactly one target language macro, it checks the textual consistency of every macro use, to ensure that the macro text "works" in all contexts of use. It checks the textual consistency between fragments generated during previous translation sessions and those generated during the "current" session, to ensure that pieces of an included file "work" in all contexts of use.

Translator Overview

This section introduces a "fragment tree" as a means of representing macro invocations, macro actual parameter substitutions, and source inclusions in a program. It gives an overview of the translator phases, including steps to preserve the fragment tree. It then describes in detail the structure of the fragment tree and gives a fragment tree translation method.

The Rosetta Translator behaves like a normal compiler, with a few additional steps. A pTAL syntax tree represents the syntactic structure of the virtual source. Tokens appear on the leaves of the otherwise traditional abstract syntax tree. Each token is also associated with a fragment, indicating which virtual source production mechanism brought it into the virtual source. The syntax tree and the fragment tree are said to be "joined at the tokens."

The scanning phase builds the pTAL fragment tree. The pTAL syntax tree is translated to a C++ syntax tree. An additional translation step converts the pTAL fragment tree to the C++ fragment tree.

Figure 4:
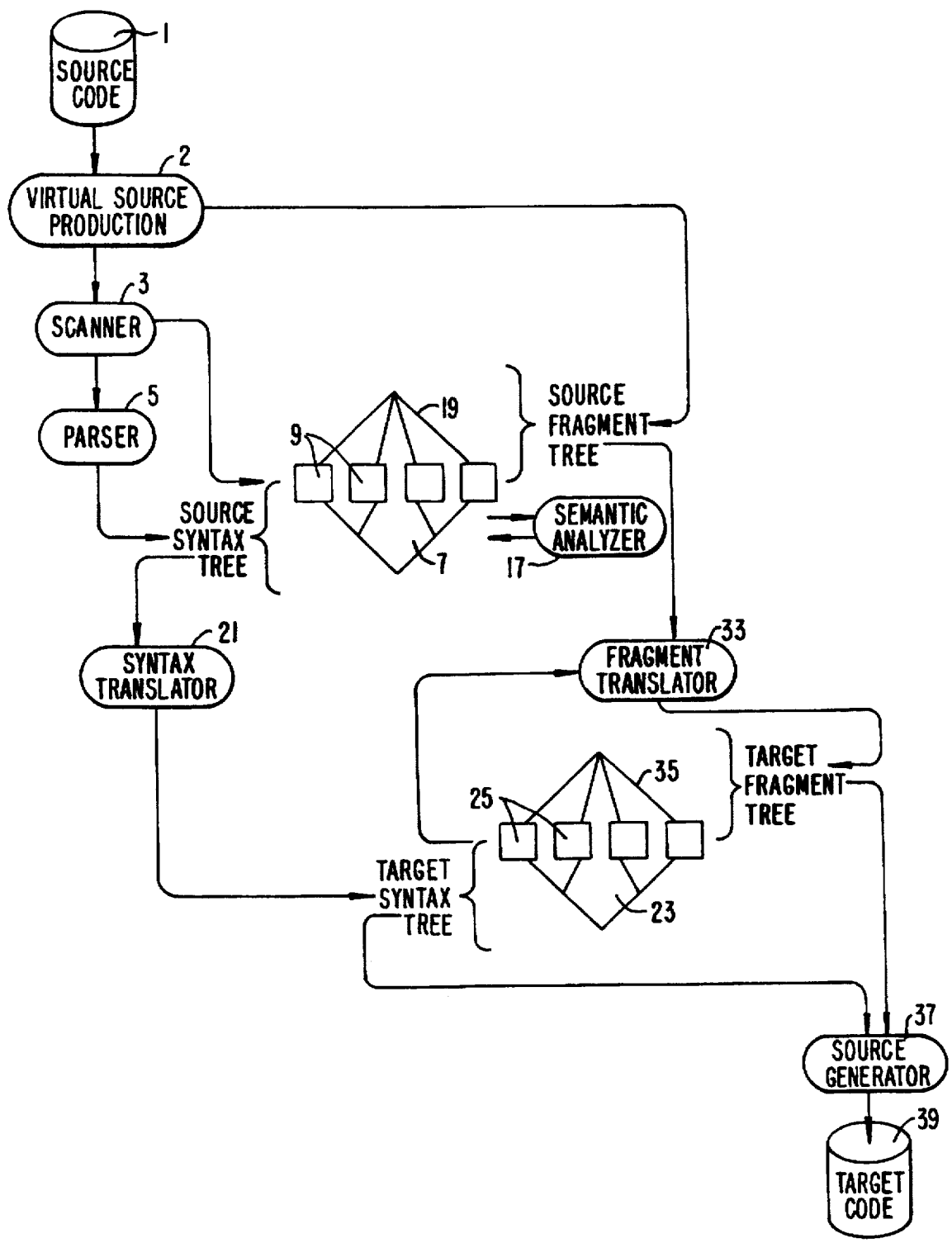
FIG. 4 is a block diagram depicting data flow through an automated source code translator in accordance with one embodiment of the present invention.

After translation, each C++ macro invocation fragment or source inclusion fragment contains a sequence of C++ tokens that represents text belonging in that macro body or included file. The source generator pieces together translated instances to form a generated text file. Tokens and comments are formatted (assigned file positions) based on the syntax that contains them, taking cues from the formatting of the corresponding source language construct. FIG. 4 depicts a general diagram of the Rosetta Translator's data flow.

Following is some sample pTAL source code, and the translated C++ source code.

| pTAL Code | Generated C++ Code |
|---|---|
| define less(x) = a < x#; | #define less(x) a < x |
| ... | ... |
| while less(42) do ... | while (less(42)) ... |

Figure 9:
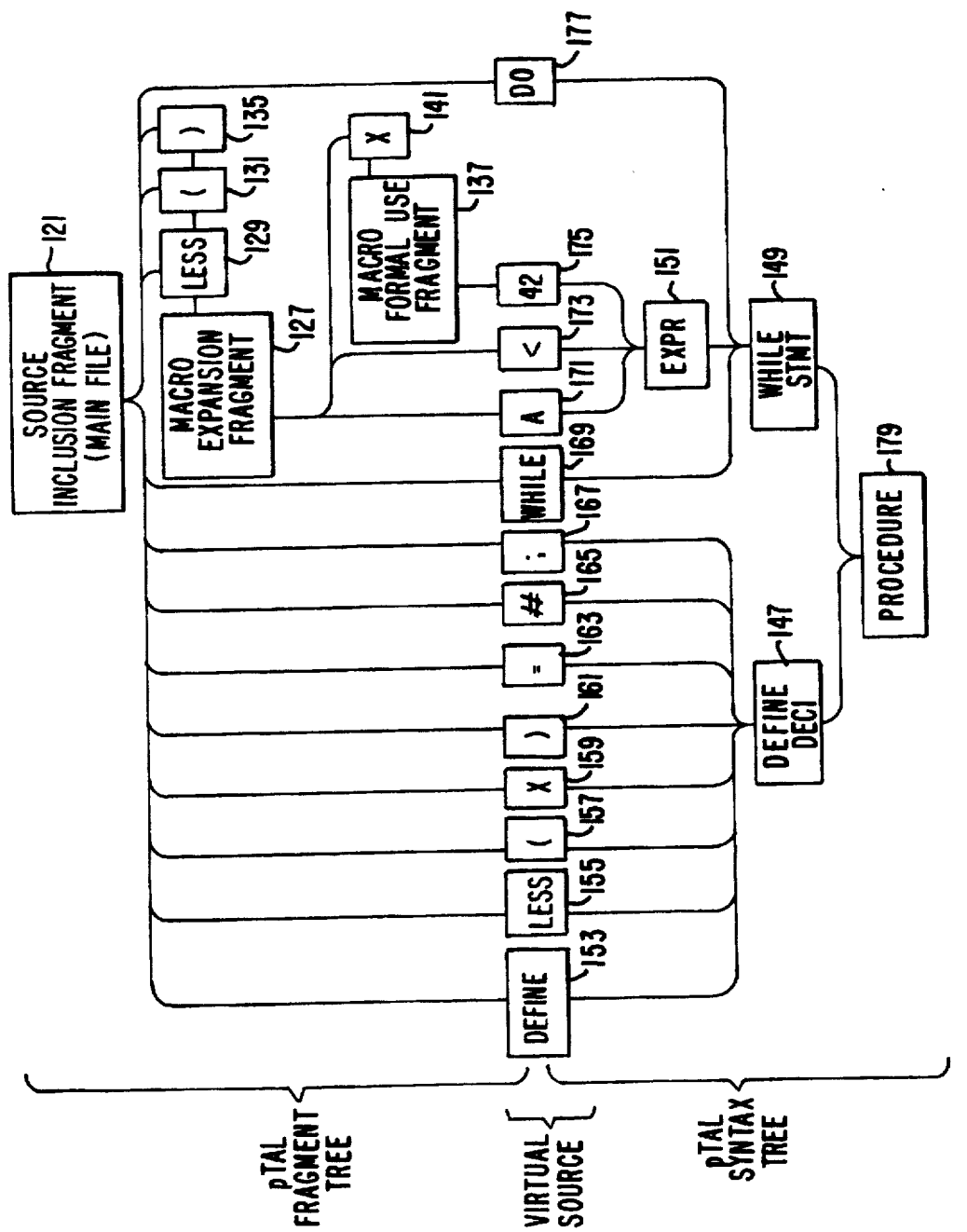
FIG. 9 depicts an example fragment tree and syntax tree, using a high-level computer language, pTAL, as the source language.

FIG. 9 illustrates the fragment tree that represents the pTAL while loop from the previous example. The tokens in the virtual source are in both the fragment tree and the syntax tree.

Properties of Fragments

Fragments have some interesting properties:

A pTAL fragment is semantically equivalent to the C++ fragment to which it translates. For a macro to "work", it must expand to a meaningful token stream in every context of use in the generated code. For a macro to be readable and maintainable, it must be invoked for the same purposes in the generated code as in the source code; it must provide the same benefit by encapsulating equivalent target language text. These considerations for macros also apply to code included from another file and to macro actual parameters.

Tokens in a pTAL fragment must be translated in their context or contexts of use. Macros cannot be translated immediately at their point of definition because, even if the text could be parsed, semantic analysis would not be possible. Only when the macro is expanded in context is the semantic information necessary for translation available. Macros are, therefore, translated after their invocations have been expanded and analyzed. The actual parameters of a parameterized macro and regions of included text are processed analogously. The bodies of unused macros are not translated, and unused actual parameters are not translated.

An important implication of this property is that shared interface files containing macro definitions or conditional compilation tend to be translated incrementally, as a side effect of translating the modules that use them.

A pTAL fragment should translate to the same C++ text in every context of use. A macro body is translated once for each expansion in the virtual source. The Rosetta Translator chooses to produce exactly one target language macro for each source language macro; this design decision requires that the translation of every instance of a macro expansion be textually identical. The Rosetta Translator can only be sure that the translation of a macro "works" in every context of use if every instance of the macro expansion translates to textually identical generated code. A textual mismatch might occur, for example, when the syntax expressing two distinct operations is the same in the source language but different in the target language. The pun (one phrase with two distinct meanings) does not translate. Strategies for avoiding textual mismatches and for coping with mismatches that cannot be prevented are discussed later in this document. The same considerations apply to code included from another file and to macro actual parameters.

Construct translations should not blur fragment boundaries. Each pTAL syntactic construct is mapped to a corresponding C++ syntactic construct, and pTAL tokens within that construct are mapped to corresponding C++ tokens within the corresponding C++ construct. While the tokens in the resultant token stream need not maintain the same relative ordering as the pTAL tokens that generated them, fragment boundaries are points of ordering enforcement. Each token in a given C++ fragment is generated from some token in the same pTAL fragment. Strategies for avoiding fragment boundary violations and for coping with violations that cannot be prevented are discussed later in this document.

Translating the Syntax Tree

The Rosetta Translator translates the source language syntax tree, generating an equivalent target language syntax tree. The translation routines for most source language constructs generate idioms in the target language when appropriate.

The Rosetta Translator associates each generated target language token with one source language token. The "translation" of a source language token creates a target language token and establishes this association. The choice of which pTAL token is associated with a given C++ token determines the fragment in which that C++ token belongs: the C++ counterpart of the pTAL fragment in which the associated pTAL token resides.

Some constructs allow a one-to-one mapping from source language tokens to target language tokens. If tokens do not map one-to-one, the Rosetta Translator chooses token mappings that maximize "semantic congruence," that is, it tries to associate tokens with their logical counterparts. Choosing appropriate mappings helps ensure meaningful macro translations. The collection of tokens contained in a macro body (or macro actual parameter) in the source language tends to generate a collection with the same meaning in the target language.

Figure 10:
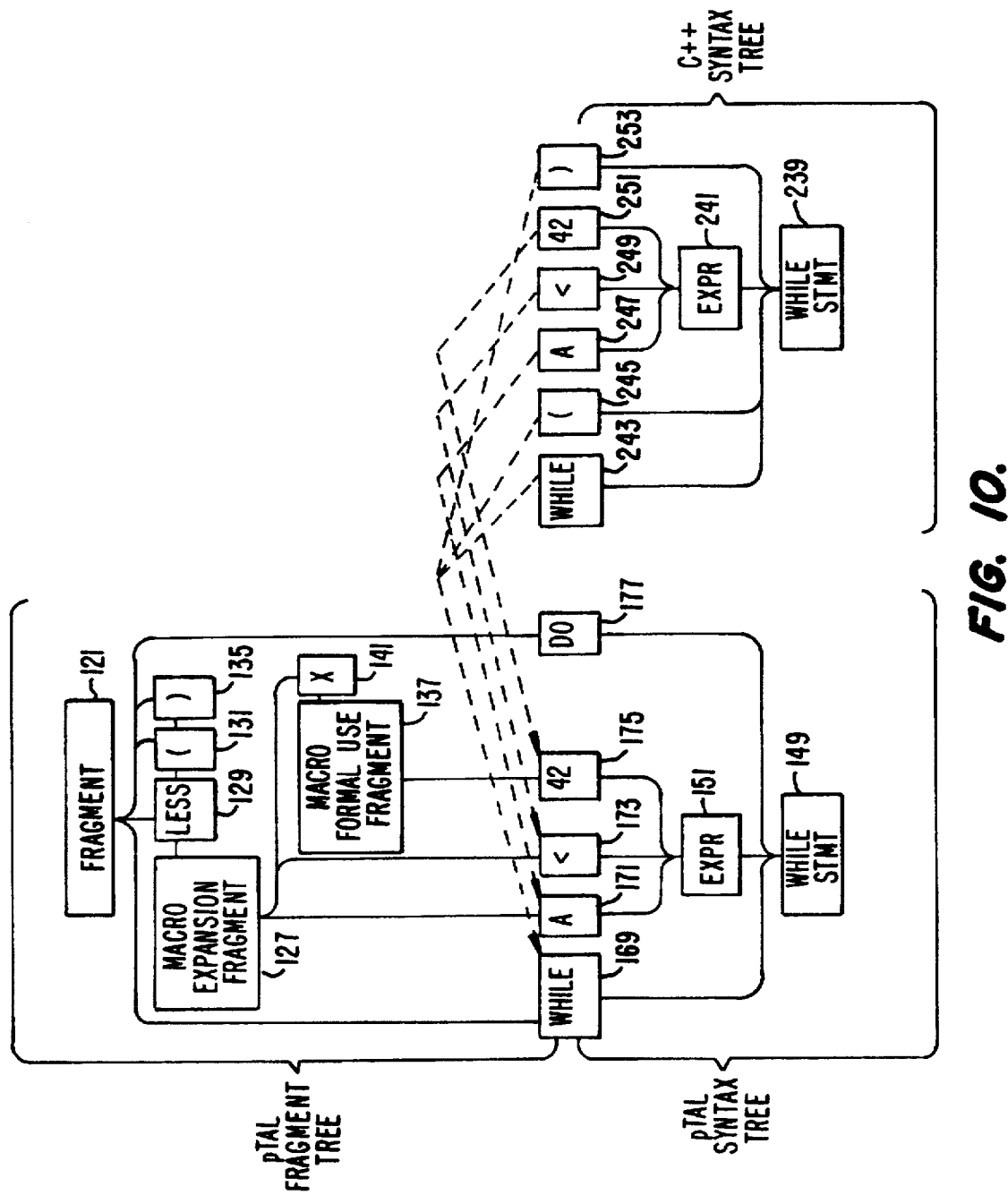
FIG. 10 depicts the example PTAL source fragment tree and source syntax tree, including the leaves (tokens) that link them, introduced in FIG. 9. It also shows a target syntax tree of another high-level computer language, C++, that represents a translation of the source syntax tree and half of the target doubly-rooted tree.

FIG. 10 illustrates part of a pTAL syntax tree and fragment tree, joined by the pTAL tokens making up the virtual source. The dashed lines depict links between each C++ token and the pTAL token that generated it. The tokens in the relational expression map one-to-one from the source language to the target language. The source language "while" keyword generates the target language parentheses tokens in addition to the target language "while" token.

Translating the Fragment Tree

After building the C++ syntax tree, the Rosetta Translator traverses the target language virtual source token stream, and builds the C++ fragment tree, based on the position in the pTAL fragment tree of the source language token associated with each target language token encountered in the virtual source stream.

The method given in this section builds a target language fragment tree. Operations are as follows:

Attach(x, y): Attach x to y; y becomes the parent of x. x is added positionally after pre-existing siblings.

Translate(n): Translate n (token or fragment) to the target language version of the object, and return the translation.

Translation(n): Return the latest translation of the fragment n; nil if it has not been translated.

Parent(n): If n is a token, return the fragment in which n resides. If n is a fragment, return the invocation syntax of the fragment (macro name token, for example).

IsOpen(n): Return true if the fragment n is open in the target fragment tree. The "open" nodes in the target language fragment tree include the ancestors of the last token that was added to the fragment tree. Adding a child to a fragment "closes" nodes that are no longer ancestors of the latest token added.

Begin by translating the main source include fragment. This fragment is initially open.

```
FOR (TargetToken = each token in the target language virtual source) BEGIN
        SourceToken = the source token associated with the current TargetToken
        SourceFrag = Parent (SourceToken)
        IF (IsOpen (Translation (SourceFrag)))
        THEN BEGIN
                /* add a new token to an existing fragment that is already open */
                TargetFrag = Translation (SourceFrag)
                Attach (TargetToken, TargetFrag)
        END ELSE BEGIN
                /* create a new fragment, and add the new token to it */
                TargetFrag = Translate (SourceFrag)
                Attach (TargetToken, TargetFrag)
                SourceInvSyntax = Parent (SourceFrag)
                TargetInvSyntax = Translate (SourceInvSyntax)
                Attach (TargetFrag, TargetInvSyntax)
                SourceFrag = Parent (SourceInvSyntax)
                /* Create new fragments and invocation syntax until TargetToken is
                connected to the tree. */
                WHILE (NOT IsOpen (Translation (SourceFrag)) ) BEGIN
                        TargetFrag = Translate (SourceFrag)
                        Attach (TargetInvSyntax, TargetFrag)
                        SourceInvSyntax = Parent (SourceFrag)
                        TargetInvSyntax = Translate (SourceInvSyntax)
                        Attach (TargetFrag, TargetInvSyntax)
                        SourceFrag = Parent (SourceInvSyntax)
                END WHILE
                TargetFrag = Translation (SourceFrag)
                Attach (TargetInvSyntax, TargetFrag);
        END ELSE
END FOR
```

Code Replication

While the target fragment tree usually has a shape similar to the source fragment tree, this method allows for code replication and reordering to produce new subtrees or subtrees in new places (when, for example, the replicated or reordered code represents an entire macro expansion).

The "for" loop from the example in the next example uses a macro invocation in place of the control variable.

| pTAL Code | Generated C++ Code |
| --- | --- |
| define i(x) = an[x]#;<br>for i(4) := 0 to 4 do | #define i(x) an[x]<br>for ( i(4) = 0; i(4) <= 4; i(4)++) |

The Rosetta Translator preserves the semantics of the original code only if the code in the control variable of the for loop executes without side-effects. This issue is independent of the presence or absence of macro invocations in a for loop; the issue relates to the replication of code.

Experience with the Rosetta Translator

Automated translation is an important vehicle for migrating critical system code out of a proprietary programming language. Taken together, system products contain millions of lines of code, of which hundreds of thousands of lines are shared interfaces which contain many thousands of macros. These macros contain a wide variety of language constructs, and the language constructs are often not well-formed. The Rosetta Translator facilitates this migration. At this writing, preliminary translations have converted major parts of Tandem's core system software to C++.

This section describes the principles and requirements that guided the design of the Rosetta Translator.

Requirements of the Rosetta Translator

The Rosetta Translator was conceived as a way to reduce and eventually eliminate dependence on a proprietary systems programming language while supporting huge bodies of legacy software. To that end, the Rosetta Translator performs highly automatic translation from Tandem's portable Transaction Application Language (pTAL) to a subset of C++. The translated software is more portable and is compatible with commercially-available programming tools. New software can make use of the object-oriented programming paradigm while interoperating with legacy code. The resulting C++ source code is sufficiently readable and maintainable that the original pTAL source code can be retired.

The Rosetta Translator has several requirements:

The translation process must be highly automated. The Rosetta Translator must translate an entire product in a short elapsed time. The Rosetta Translator must be "highly automated," but not necessarily completely automated. The Rosetta Toolset includes a set of problem analysis tools to speed elapsed translation time. Automatic source-to-source translators can be criticized for automatically translating only a subset of the source language or for generating obfuscatory code, and source-to-source translators that decline to translate some features of a language can be criticized as useless when the source code is very large. The Rosetta Translator is an industrial strength toolset that must not substantially subset the source language for the convenience of the translator. It also must make use of commonly used idiomatic features of the target language, and must avoid translations that, while strictly safe, are not particularly readable or maintainable. The Rosetta Translator can take cues from a human expert to help it avoid generating awkward code.

The translation process must allow incremental translation on a module-by-module basis. To ease the transition from one implementation language to another, a product must be able to export translated interfaces before translating all of its implementation modules, and it must be able to phase translation of the product, one module at a time. The resultant C++ code must be interoperable with pTAL code.

The resultant code must faithfully reproduce the semantics of the original program.

The resultant code must be readable and maintainable. The generated program must be as readable and maintainable as the original code to a programmer familiar with both languages and the product that the code implements. A programmer familiar with the product must find that after translation, he or she still holds a valid mental model of the implementation. Identifiers must be mapped to reasonable spellings. Comments must appear adjacent to the code that they describe, even when that code has been moved. Patterns or pictures embedded in end-of-line comments must be preserved to the extent possible. The format of the code must appear natural in the target language, though some aspects of the format might follow the style and alignment of the original code, reflecting the preferences of the author. Macros defined in the source code must, to the extent possible, encapsulate the same meaning in the translated code.

The Rosetta Translator generates output that looks natural in its new language but does not significantly alter the design of the program. One of the great investments that software companies must make is in software maintenance, and one of the great assets that a software maintainer might have is familiarity with the implementation details of a large and complex software system. Substantial redesign is best done by the programmer, who is not only best qualified to make a complex judgement call, but can later make good use of the experience of doing so.

The resultant code must be efficient. Execution speed of a generated program must be comparable to that of the original pTAL-coded program. While fulfillment of this goal lies more in the hands of the compiler that implements the target language, we did have the opportunity to take into account performance of various constructs when designing their translations.

These requirements led to a number of challenges for the Rosetta Translator, including maintaining dual language interfaces, mapping tokens in language constructs, and dealing with inconsistently translated fragments.

Maintaining Dual Language Interfaces

Unfortunately, converting a product to C++ does not immediately obviate the need to use the pTAL language. Products that export a pTAL-coded interface must continue to export that interface in pTAL as well as C++ until no pTAL clients remain. Because of the size and complexity of externalized interfaces, and because of the opportunity for error inherent in manually maintaining parallel interfaces in both languages, it is essential that a product maintainer update just one copy of an interface and use a tool to generate the interface in the other language. The Rosetta Translator is that tool. The product maintainer uses the pTAL version as the reference copy.

This problem implies that the Rosetta Translator must emit code that is ready-to-roll. If any adjustment or enhancement to an interface file is necessary, then the adjustment or enhancement must be made to the pTAL code so the generated C++ can be read and used as is. Because pTAL does not support many useful C++ features, we supply a way to express new C++-only constructs in the pTAL source. The pTAL compiler ignores such constructs.

Objects in shared interfaces are only available to clients that have converted to C++ because the reference language, pTAL, cannot express them. Thus, a language conversion does not immediately clear the way for a paradigm shift visible in externalized interfaces.

Translating Language Constructs

Translation of each syntactic construct carries out a lexical mapping from source language lexical elements to target language lexical elements. The choice of target language construct and mapping of tokens from a source language construct to a target language construct is a matter of maximizing semantic correspondence between the lexical elements.

A few simple principles guide choices of construct translations in the Rosetta Translator. These principles are intended to make the resultant code appear more natural than most machine-generated code.

Generate simple resultant code to emulate simple source code, even if the transformation is not general. Generate complex resultant code only when necessary to emulate a difficult corner of the source language. For example, the pTAL language allows structure fields to overlay any other type field arbitrarily. If the space allocating field is at least as large as the fields that overlay it, the Rosetta Translator generates a C++ union. If it is not, the Rosetta Translator generates a macro invocation that, in turn, provides access to the appropriate memory location when the field is used. The next example depicts the translation of a structure type and variable.

| pTAL Code | Generated C++ Code |
|---|---|
| struct s; | class __s { |
| begin | public: |
|     int i; |     union { |
|     int j = i; |         short i; |
|     int a; |         short j; |
|     int(32) b = a; |     }; |
| end; |     short a; |
| |     __redef (long, b, a); |
| | } s; |

The Rosetta Translator generates references to macros, such as the invocation expression "__redef" in this example, that encapsulate the emulation of difficult pTAL features. These macros reside in an include file, "rosetta.h".

Use simplifying transformations when possible. For example, in C++ the address of the beginning of an array is easiest to express using the name of the array, so if the Rosetta Translator initially generates "&arrayname[0]", it applies a simplifying transformation to produce "arrayname."

Attempt to generate idioms commonly used in the target language. For example, C++ users frequently use the "++" idiom for incrementing variables; the Rosetta Translator generates this breed of idiom when appropriate.

When several equally plausible choices of coding style present themselves, preserve the style that the programmer used. For example, when choosing between C++ "*varname" and "varname[0]", the Rosetta Translator emulates the style of the pTAL code.

Strategies for Coping with Poorly Matched Language Constructs

Several strategies are possible to cope with translating one source language to another when the language constructs do not map precisely to one another at the token level. The Rosetta Translator uses the following strategies, each where it is most useful:

Restrict the source language to constructs that can be translated directly into the target language. This approach simplifies construct translation. The main disadvantage is that the user must either avoid using the untranslated constructs or correct the generated code. This is only practical when an equivalent supported construct exists, or when virtually none of the legacy source code actually contains the forbidden construct. We chose to restrict certain source language constructs that cannot be expressed in the target language. such as taking the address of a label. We also chose to restrict certain source language features whose translation would especially lack readability, such as pTAL expressions that depend on order of evaluation. The restricted constructs can be recoded easily. The Rosetta Toolset offers semiautomatic help in removing dependencies on these features.

Extend the source program to give extra information that leads to a better translation. With a small amount of information from a programmer familiar with the source code, the Rosetta Translator can create much more natural looking generated code. The main disadvantage is that the user must modify his or her source code before translating.

The Rosetta Toolset offers tools to make that activity less tedious and less prone to error, and to make optimal use of a programmer's time. The Translator detects when a specific kind of information would be helpful and issues an appropriate diagnostic. A programmer familiar with the source code responds to the Rosetta Translator's request for semantic hints by embedding a special comment in the source code from which the Rosetta Translator can glean the extra information it needs. Supplying hints this way does not disturb the behavior of the source code and does not require extending the source language's compiler. The information is also retained in the original source code for future retranslations. The problem analysis tools simplify the tasks performed by the human expert by inserting the desired special comment in exactly the right place.

For example, the pTAL language has no declarations of unsigned variables, but instead offers unsigned operators that carry out unsigned arithmetic. A user can mark a pTAL variable as unsigned by inserting a particular comment into the variable declaration. The Rosetta Translator translates it as a true unsigned variable, obviating the need for type casts to force unsigned operations. The next example depicts the translation of an unsigned operation.

pTAL Code     Generated C++ Code int steve;short steve;

i :=steve '+'1234;i=(unsigned short)steve+1234;

!unsigned! int dano;unsigned short dano;

i :=dano '+'1234;i=dano+1234;

Hide the complexity of the translated code by emitting a meta-language (via macros) to implement very complex corners of the language. This is a portable way of extending the target language. This approach can preserve readability even when a simple construct from the source language translates to a fairly complex construct in the target language. The main disadvantage is that the software maintainer must learn how to use the special macros. For example, bit extraction and deposit operations on integers are supplied as macros in an include file, rosetta.h. The next example depicts the translation of bit extraction and bit deposit.

pTAL Code     Generated C++ Code x :=i.<4:5 >;x=__bit__extract(i, 4, 5);

i.<0:3>:=x;__bit__deposit(i, 0, 3, x);

Extend the target language to handle hardware dependencies that cannot be expressed in the standard target language.

The target language was extended to support some special functional requirements of Tandem systems software. The target language was not extended merely to accommodate automatic translation. The Rosetta Translator translates systems programming constructs from the source language to target language extensions. For example, pragmas were added to produce similar data layout between C++ and pTAL.

Handling Comments

Source-to-source translators can use one of several strategies for translating comments that appear interspersed in the source language program:

Gather and translate comments separately from the source code. then collate the translated comments with the translated program text into the output stream [5]. This strategy simplifies translation by separating the issue of comment association from the problem of language construct translation. One disadvantage is that comments describing code that was reordered are difficult to place sensibly.

Associate comments with the syntactic construct in which they are embedded [1]. This strategy reorders comments and code together, and the comment placement issues do not clutter language construct translations. One disadvantage is that very fine-grain associations might not be preserved. Text-based preprocessors, such as document generators, that use special comments as cues might accept a new language as input more easily if finer-grain associations were preserved.

Associate comments with a nearby token. The Rosetta Translator's strategy is to bind comments closely to a token and to translate the comments associated with each token when the token is mapped to the target language. One disadvantage is that when source language tokens do not correspond one to one with target language tokens, the translations of syntactic constructs must explicitly specify comment mapping. This strategy trades off complexity for control, and increased control is desirable to preserve appropriate comment placement.

The Rosetta Translator is able to preserve end-of-line comments in their original form, which is especially useful when the information contained therein is tabular or pictorial in nature. All comments remain associated with the tokens they describe, even if part of the enclosing construct must be moved.

When a source token is mapped to a target token, comments tied to the former are automatically translated and attached to the latter. Routines implementing language construct translations must account for the comments associated with each source language token. If a source language token maps to no target language token, then its comments must be moved to an appropriate token that will be mapped.

The appearance of the generated code can benefit from construct translation routines that create comment associations that might differ from token associations. For example some construct translations appear more natural if the comments that appear before the first source language token in a particular construct also appear before the first target language token in the translated construct, even if the first source token does not map to the first target token.

Comments scanned in fragments that contain no tokens are associated with the static fragment, translated separately from the tree translations, and appear in the analogous C++ static fragment.

Fragment Consistency

Because the Rosetta Translator's design requires that each source language macro maps to exactly one target language macro, it checks that every macro use is textually identical, to ensure that the macro text "works" in all contexts of use. It also checks included files. The scope of a macro actual parameter is limited to the macro body itself, so the Rosetta Translator need only check that all expansions of a formal parameter within a given macro expansion are textually identical.

This and the next few sections discuss diagnosing fragment textual mismatches, strategies for minimizing mismatches, and remedies for mismatches that cannot be prevented.

Fragments Containing Puns

When the syntax for expressing two different operations is different in the target language but the same in the source language, a fragment translation might not "work" in every context of use. In programming languages as in natural language, puns tend to translate poorly. When type compatibility rules differ between the two languages, for example, type casts can lead to a mismatch in macros that are used in conjunction with multiple types.

The following example illustrates an error condition: the translation of two expansions of the same macro result in different macro body text. All instances of a macro body must be checked for consistency before output source generation. The Rosetta Translator generates references to macros, such as "__redef" and "__tobitfield" in this example, that encapsulate the emulation of difficult pTAL features. In this case, the integer field "a" overlays the bit field "k". The "__tobitfield" macro takes the name of the surrounding class type as a parameter. That name is different for the two uses of the macro: "f__" versus "g__". The next example depicts a macro whose two uses result in macro body text that does not match; mismatching tokens are in bold.

| pTAL Macro | Generated C++ Macro |
|---|---|
| !zero-length array causes a to overlay k! | |
| define fields = | int a [0:−1]; #define fields |
| *ERROR* | |
| unsigned(1) k #; | |

| pTAL Code | Generated C++ Code |
|---|---|
| struct f; | class f__ { |
| begin | fields; |
| fields; | } f; |
| end; | |
| struct g; | class g__ { |
| begin | fields; |
| fields; | } g; |
| end; | |
| pTAL Code Expansion | C++ Code Expansion |
| struct f; | class f__ { |
| begin | __redef{short, a, __tobitfield(f__, k)); |
| int a [0:−1]; | unsigned k:1; |
| unsigned(1) k; | } f; |
| end; | |
| struct g; | class g__ { |
| begin | __redef(short, a, __tobitfield(g__, k)); |
| int a[0:−1]; | unsigned k:1; |
| unsigned(1) k; | } g; |
| end; | |

Blurred Fragment Boundaries

If a construct translation blurs fragment boundaries, the translated fragment tree looks as if two instances of the fragment were created, and the contents of those fragments are not textually identical. Fragment boundary violations are detected by the same fragment consistency check that detects puns that do not work. The following example illustrates a blurred fragment boundary in a use of an ill-formed macro.

If precedence rules differ between the two languages, then introducing parentheses to preserve the original expression's semantics can lead to a consistency violation. The pTAL language assigns higher precedence to the left shift operator than to the addition operator. The C++ language assigns higher precedence to the addition operator than to the left shift operator. Parentheses appear in the target language version of the expression to retain the order of evaluation. The parentheses tokens happen to be generated from the higher precedence operator, which determines their fragment assignment.

| pTAL Code | Expansion of pTAL Code | Generated C++ Code |
|---|---|---|
| define fred(p) = p << 2#; | | |
| ... | | |
| a := fred (x + 1) ; | a := x + 1 << 2; | a = x + (1 << 2) ; |

The translation of the previous example results in a C++ fragment tree that appears to have two instances of the actual parameter fragment which do not contain identical text.

Strategies for Minimising Inconsistently Translated Macros and Macro Actual Parameters Inconsistently translated macro bodies and macro actual parameters can be minimized by building special rules into the token mapping methods, when possible.

Suppress simplifying transformations on the generated code when inside of a macro expansion. Generally, syntax transformations are not sensitive to whether or not the generated code is inside of a macro body expansion or macro formal parameter expansion. Some routines that perform construct translations are sensitive to fragment boundaries, though they do not translate fragments. These routines suppress simplifying transformations within a macro expansion or macro formal parameter expansion in order to make translations for different macro invocations textually identical. For example, the transformation simplifying the text "&arrayvar[0]" to "arrayvar" is suppressed within a macro when the index is in a macro parameter. Likewise, the transformation simplifying the text "(*ptr).field" to "p->field" is suppressed when "*p" is a macro actual parameter.

Absorb tokens that differ between invocations of a macro into an actual parameter, when possible. Source language tokens might generate not only the logical translation of themselves, but also some attendant baggage. If that baggage can differ in two different invocations of the same macro, there is no problem if the baggage is mapped to the actual parameter rather than the macro body. For example, C++ parentheses generated to force the appropriate operator precedence should be absorbed into the translated actual parameter if they surround C++ tokens generated only from pTAL actual parameter tokens.

Likewise, if a C++ "*" operator was generated in the translation of an implicitly dereferenced pointer in a macro actual parameter, the "*" operator should be absorbed into the translated actual parameter so that nonpointer variables can be passed into the macro.

Extrude tokens that differ between invocations of a macro into the fragment containing the macro invocation syntax.

Similar to the strategy previously described, if the differing tokens are on the edge of the C++ translation of a macro body, there is no problem if they are mapped outside. For example, if a C++ type cast applies to an entire macro expansion, then the generated text should show the type cast applied to the macro invocation syntax.

Remidies for Inconsistently Translated Macros and Macro Actual Parameters

Although a careful design of token associations, taking into account common coding practices in the source language, can ensure that fragment mismatch problems are a rare event, it cannot prevent all possible problems. When an inconsistently translated macro or macro actual parameter occurs, the user can choose from three remedies. Each of the remedies can solve any fragment mismatch problem. If the macro in question is exported, changing the macro interface in the original language implementation is usually not possible.

Recode the macro body so that the translation "works." This strategy is viable if recoding the body of the macro avoids the problematic construct and does not disturb the interface or the usage of the macro. If recoding the macro requires changes at all points of use, then this might not be a viable solution.

Give the Rosetta Translator permission to expand all uses of the macro. This strategy eliminates any fragment mismatch problem at the cost of deimplementing the macro that contained a problem. It is not a desirable solution if the macro was useful for improving the usability, maintainability, or readability of the software, or if the macro was exported. It is a viable solution if the product maintainer is not interested in preserving the macro. The next example illustrates the expansion of a macro.

| pTAL Code | Generated C++ Code |
|---|---|
| define !expand! shifty (x, y) = x << y#; | |
| a := shifty(2, 3); | a = 2 << 3; |

Give the Rosetta Translator permission to create an additional macro parameter to encapsulate the differences. This strategy eliminates any fragment mismatch problem. It has the potential of producing actual parameters in the target language code that are less sensible than a programmer would write. Recalling the example of a mismatching macro body from the previous section, the differences can be encapsulated. The next example illustrates this encapsulation.

| pTAL MAcro | Generaed C++ Macro |
|---|---|
| !zero-length array causes a to overlay k! | |
| define fields !FORMAL:stype! = | |
|     int a [0:-1]; | #define fields(stype) \ |
|     unsigned(1) k #; | redef(short, a, |
| __tobitfield(stype, k)); \ | |
| | unsigned k: 1 |

| pTAL Code | GeneratedC++ Code |
|---|---|
| struct f; | |
| begin | class f__ { |
|   fields; |   fields (f__); |
| end; | } f; |
| struct g; | class g__ { |
| begin |   fields(g__); |
|   fields; | } g; |
| end; | |

References

1. Albrecht, P. F., Garrison, P. E., Graham, S. L., Hyerle, R. H., Ip, P., Krieg-Bruckner, B., "Source-to-Source Translation: Ada to Pascal and Pascal to Ada", *Proceedings of the ACM SIGPLAN Symposium on the Ada Programming Language*, November, 1980.

2. Atkinson, R., Demers, A., Hauser, C., Jacobi, C., Kessler, P., and Weiser, M., "Experiences Creating a Portable Cedar", *Proceedings of the SIGPLAN '89 Conference on Programming Language Design and Implementation*, June, 1989.

3. Bartlett, J., *SCHEME->C, a Portable Scheme-to-C Compiler*. Technical Report, Digital Western Research Laboratory, 1989.

4. Lemkin, P., "PSAIL: SAIL to C", *Computer Language*, 2(8), August, 1985.

5. Moynihan, V. D., and Wallis, P. J. L., "The Design and Implementation of a High-Level Language Converter", *Software—Practice and Experience*, 21(4), April, 1991.

6. Stroustrup, B., *The C++ Programming Language*, Addison-Wesley, 1991.

7. Tandem Computers, Inc., *Transaction Application Language (TAL) Reference Manual*, Version D10.

8. Waters, R. C., "Program Translation via Abstraction and Reimplementation", *IEEE Transactions on Software Engineering*, 14(8), August, 1988.

9. Weiner, J., Ramakrishnan, S., "A Piggy-back Compiler For Prolog", *Proceedings of the SIGPLAN '88 Conference on Programming Language Design and Implementation*, June, 1988.

DESCRIPTION OF THE PREFERRED EMBODIMENT

A prior art tree data structure is outlined in FIG. 1. The purpose of this data structure is to relate a set of "things," or objects in a hierarchy. One object in this set, called a root node, is at the vertex. From the root, links, called branches, connect to other objects, called nodes. In turn, the nodes may branch to other nodes ultimately terminating in a set of objects called leaves. Viewing the tree from the root to the leaves, tracing a single path of branches, nodes are ancestors of each other. Conversely, viewing the tree from a leaf to the root, again tracing a single path, nodes are descendants of each other. Choosing an arbitrary node, it is considered the child of the node to which it branches toward the root and the parent of the node branching toward the leaves.

Figure 2:
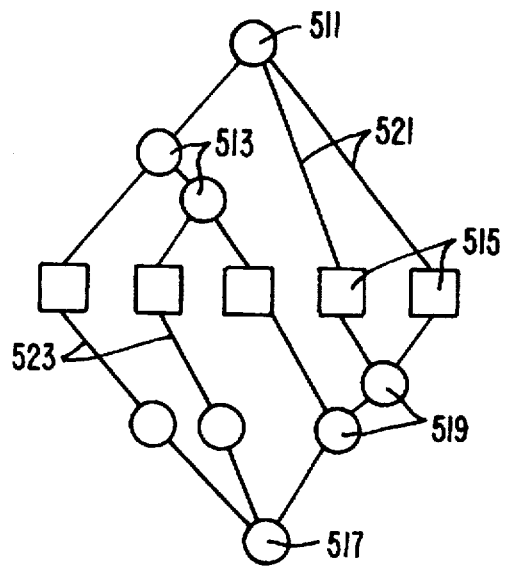
FIG. 2 depicts a doubly-rooted tree data structure, joined at the leaves, in accordance with the present invention.

FIG. 2 illustrates a contribution of the present invention to the prior art. It is termed a doubly-rooted tree data structure. This doubly-rooted tree has two roots 511 and 517, but only a single set of leaves 515. From each root emanates a tree, as in the prior art, but the nodes 513 and 519, branches 521 and 523, and hierarchical arrangement of the two trees may be different as long as the two trees co-terminate at a single set of leaves 515. In the present invention, the leaves of a doubly-rooted tree are considered tokens and are collectively referred to as the "virtual source."

Figure 2A:
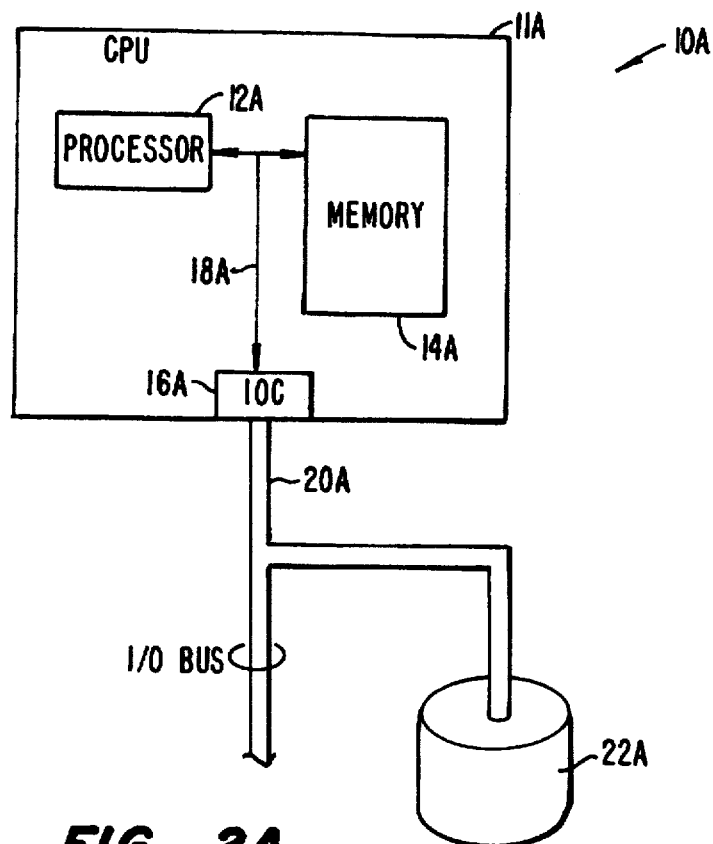
FIG. 2A is a simplified block diagram of a computing system for use with the present invention.

FIG. 2A is a simplified block diagram of a computer system, designated generally with the reference numeral 10A incorporating the data structure of FIG. 2. As FIG. 2A illustrates, the computing system 10A includes a central processing unit (CPU) 11A that is coupled to a memory 14A and an input/output channel (IOC) 16A by a bus structure 18A. The IOC 16A, in turn, connects the CPU 11A to a data storage area 22A by an input/output (I/O) 20A. The data storage area 22A may take the form of a magnetic disk media storage device, an electronic memory, or a communications link to other storage areas.

While a doubly-rooted tree is two dimensional, the concept can be expanded to three, four, or more dimensions (not illustrated). Multiple trees may co-terminate at a single set of leaves to form an N-rooted tree.

Figure 3:
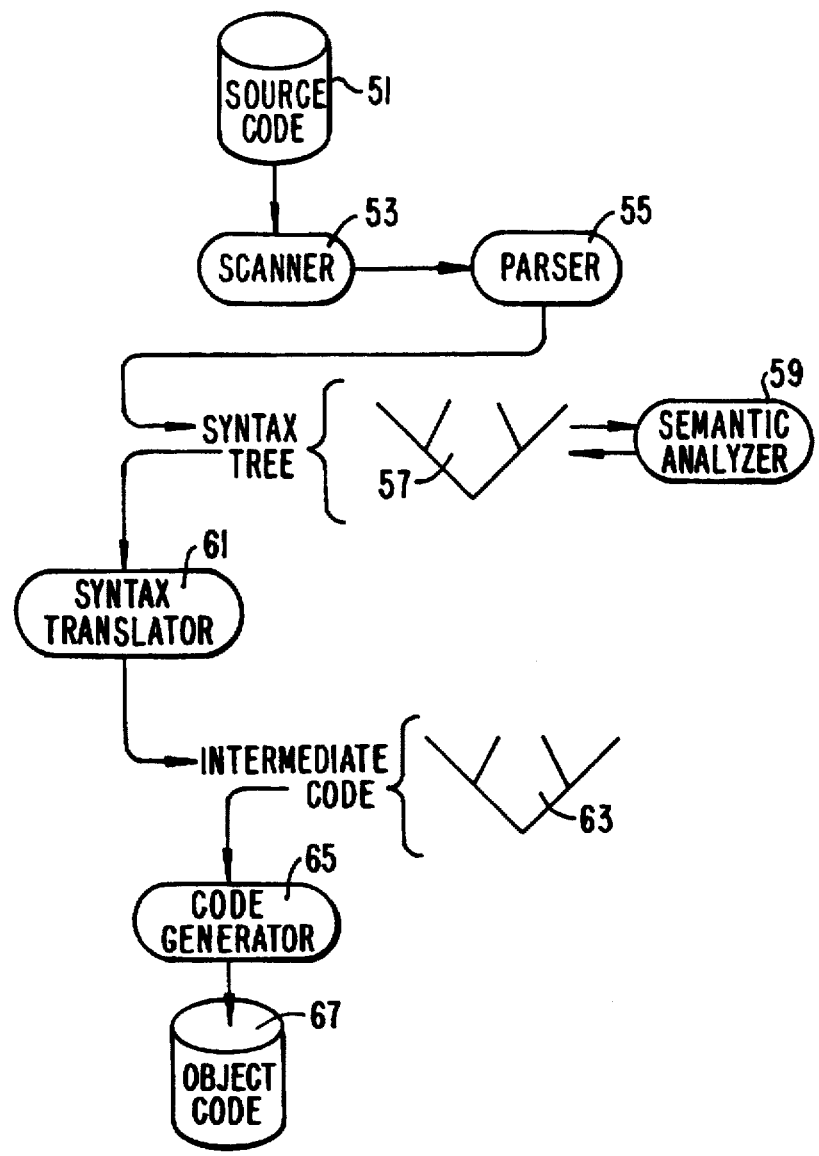
FIG. 3 is a block diagram depicting data flow through a simple prior art compiler.

Prior art trees are useful in computer language compilers such as the simple one depicted in the data flow chart, FIG. 3. In the prior art compiler, source code 51 flows first through a scanner 53, where a stream of characters is divided into recognizable "words" or tokens and then to a parser 55, which determines a hierarchical relationship among the tokens and builds a syntax tree 57. An additional step, performed by a semantic analyzer 59, further refines the syntax tree 57. A syntax translator 61 converts the syntax tree 57 into an intermediate code tree 63. In turn a code generator 65 converts the intermediate code tree 63 into object code 67. Also commonly called machine code, object code 67 is an instruction sequence which a computer can directly execute and is usually stored on magnetic media or in electronic memory. In the normal course of usage, machine code is not stored in a manner which humans can read and interpret. For background information on the construction of compilers, see Aho, Sethi, and Ullman, *Compilers: Principles, Techniques, and Tools*, Addison-Wesley, 1985.

FIG. 3A is a close view of the syntax tree 57 for the prior art compiler depicted in FIG. 3. It represents the FORTRAN statement $Z=X+Y$ (nodes 57a, 57b, 57c, 57d, 57e).

As illustrated in FIG. 4, the source code to source code translator of the present invention, in simplified form, generally follows the flow of the prior art compiler of FIG. 3. However, instead of employing simple tree data structures, the translator uses two doubly-rooted trees to preserve contextual information such as macros, conditionally compiled regions of code, source inclusion, comments, and other preprocessor characteristics.

FIG. 4A is a close view of the source syntax tree 7 and the joined leaves 9, representing virtual source, for the present translator depicted in FIG. 4. It represents the FORTRAN statement $Z=X+Y$ (nodes 7a, 7b, 7c, 7d, 7e and leaves 9a, 9b, 9c, 9d, 9e). The leaves 9 representing virtual source are absent in the syntax tree 57 for the prior art compiler depicted in FIG. 3A. The prior art compiler does not require a complete virtual source to reduce source code to intermediate language or machine code, while the present invention does require virtual source to translate from one high level language to another.

Figure 5:
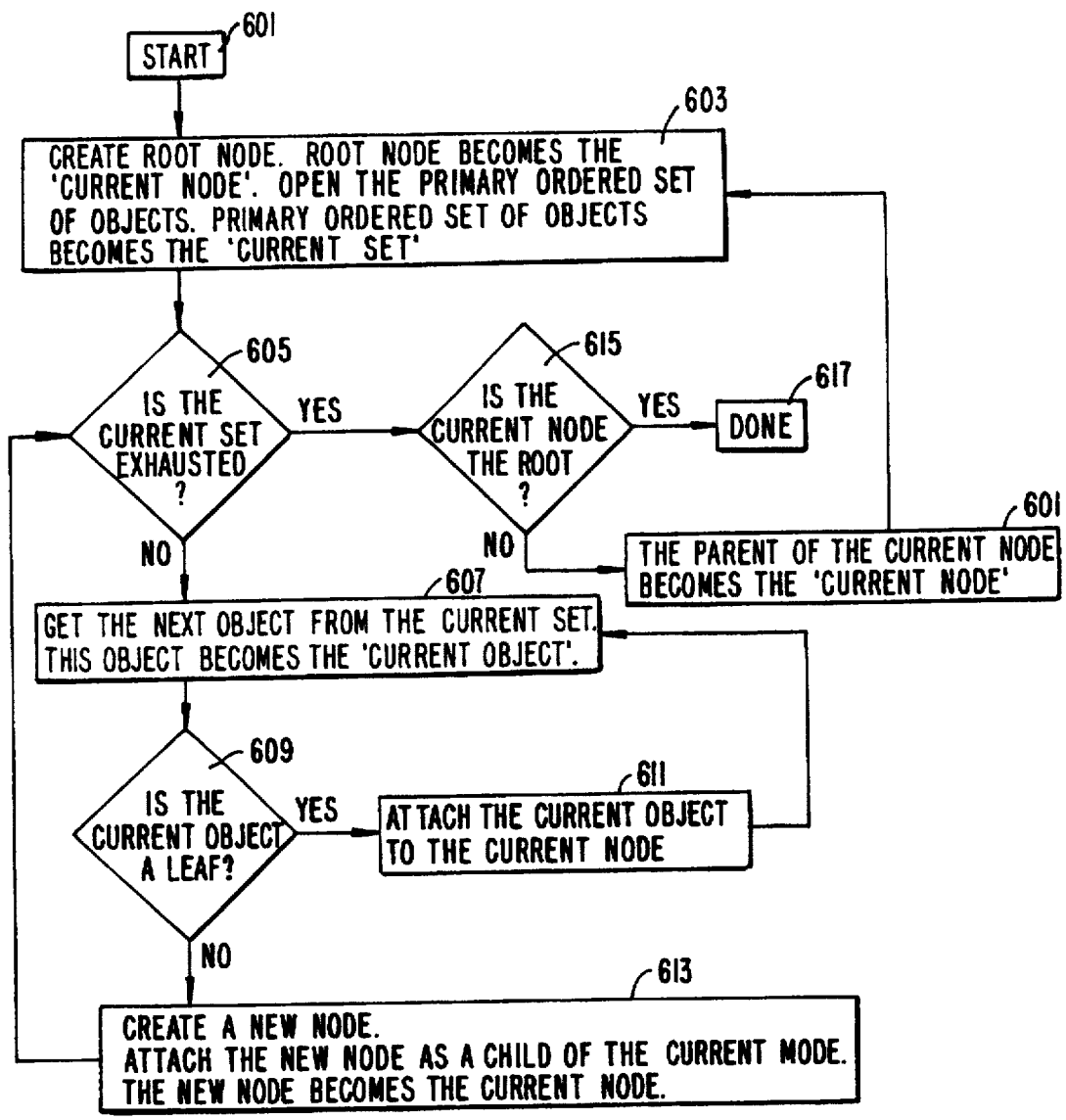
FIG. 5 is a flowchart describing a method for building a first tree in a doubly-rooted tree in accordance with one embodiment of the present invention. The method builds the tree from the top down in depth first traversal order.
Figure 6:
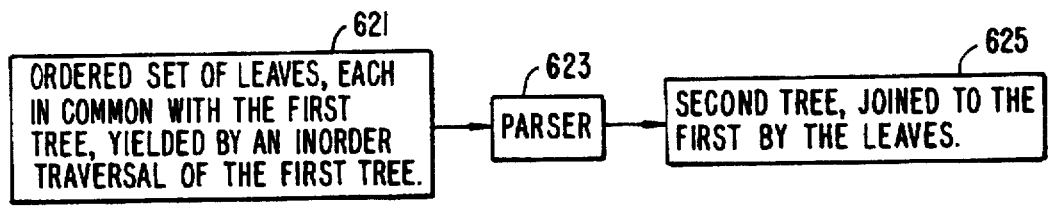
FIG. 6 is a flowchart describing the building of a second tree in the doubly rooted tree introduced in FIG. 5, in accordance with one embodiment of the present invention. An inorder traversal of the first tree yields an ordered set of leaves that is input to the parser 623. The method builds the tree from the bottom up in depth first traversal order.

FIG. 5 is a flowchart that describes a method for building of the first tree in doubly rooted tree, joined at the leaves. This method is applicable to building the source fragment tree 19 of FIG. 4. The method builds the tree from the top down. The flowchart uses the following data and operations:
Source is a set of ordered set of objects employed in step 603, one of which is identified as primary.
Ordered set of objects, operations:
  Open 603
  Test for whether or not the set is exhausted 605
  Get the next object 607
  Object is a leaf or an ordered set Operations:
  Test for whether the object is a leaf or an ordered set 609
  Attach to parent node
Node operations:
  Accept ordered attachment of children
  Get parent node FIG. 6 is a flowchart that describes a method for building a second tree in the doubly rooted tree, joined at the leaves. This method is applicable to building the source syntax tree 7 of FIG. 4. The ordered set of leaves in step 621 that is input to the parser 623 is yielded by an inorder traversal of the first tree. The method builds the tree from the bottom up.

Figures 7, 8:
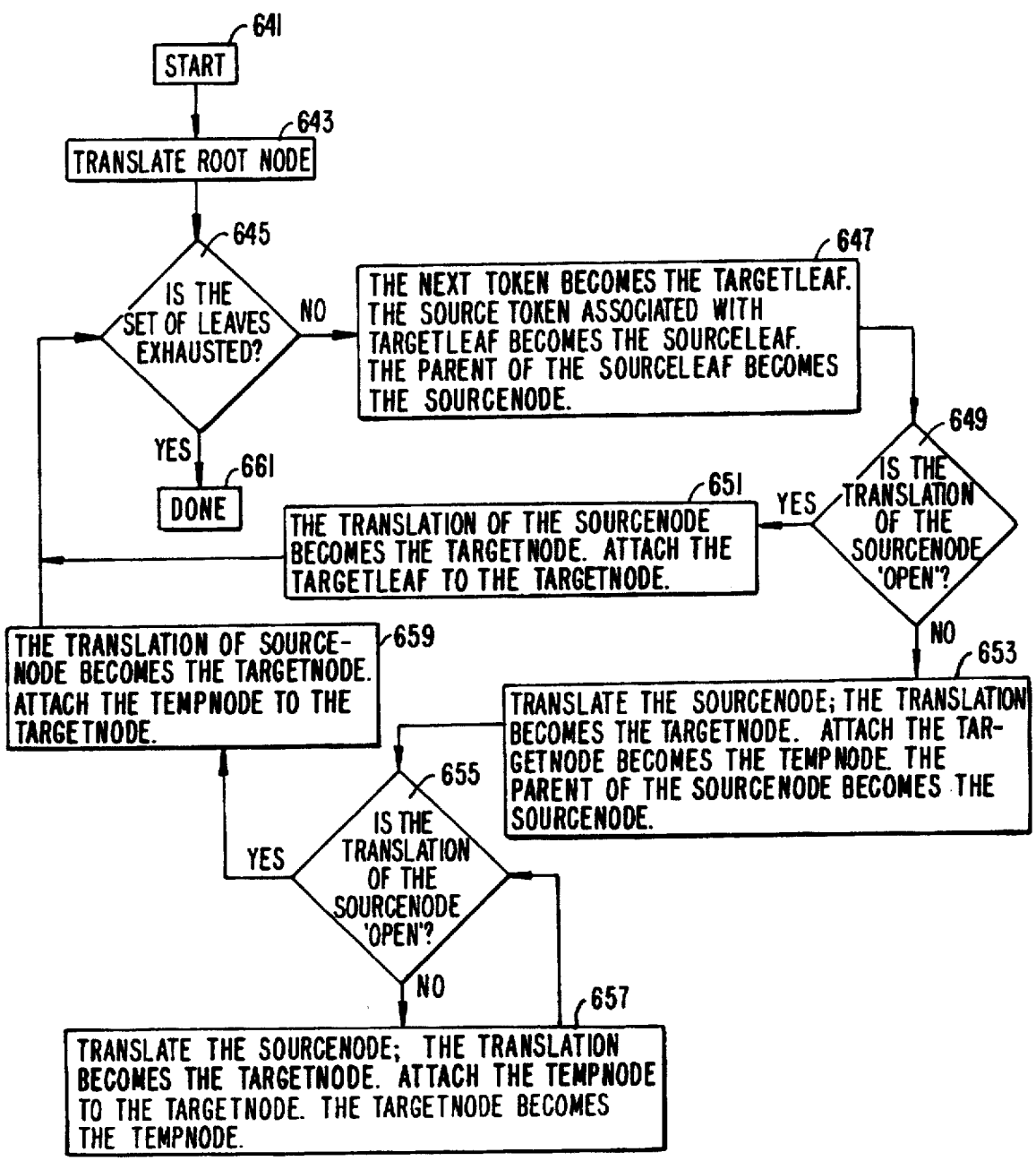
FIG. 7 is a flowchart describing the translation of a second tree in a first doubly rooted tree to a corresponding tree in a second doubly rooted tree in accordance with one embodiment of the present invention.
FIG. 8 is a flowchart describing the translation of a first tree in the first doubly rooted tree referred to in FIG. 5 to a corresponding tree in a second doubly rooted tree in accordance with one embodiment of the present invention.

FIG. 7 is a flowchart that describes the translation of the second tree in the doubly rooted tree, joined at the leaves.

FIG. 8 is a flowchart that describes the translation of the first tree in the doubly rooted tree, joined at the leaves. The flowchart uses the following data and operations:
Node operations:
  Translate
  Attach to parent node
  Test for whether the node is "open": The "open" nodes in the tree include the ancestors of the last leaf that was added to the tree. Adding a child to a node "closes" nodes that are no longer ancestors of the latest leaf added.
Leaf operations:
  Attach to parent node
Input set operations:
  Test for whether the set is exhausted Another way of describing FIG. 8 is that it shows a method of translating a fragment tree from the source doubly-rooted tree to the target doubly-rooted tree. This is a critical stage in the translation process; it is the point at which preprocessor characteristics are transferred from the source code to the target code. After building the target language syntax tree, the translator traverses the target language virtual source token stream, and builds the target language fragment tree, based on the position in the source language fragment tree of the source language token associated with each target language token encountered in the virtual source stream.

Operations are as follows:
  Attach(x, y): Attach x to y: y becomes the parent of x. x is added positionally after pre-existing siblings.
  Translate(n): Translate n (token or fragment) to the target language version of the object, and return the translation.
  Translation(n): Return the latest translation of the fragment n; nil if it has not been translated.
  Parent(n) : If n is a token, return the fragment in which n resides. If n is a fragment, return the invocation syntax of the fragment (macro name token, for example).
  IsOpen(n): Return true if the fragment n is open in the target fragment tree. The "open" nodes in the target language fragment tree include the ancestors of the last token that was added to the fragment tree. Adding a child to a fragment "closes" nodes that are no longer ancestors of the latest token added. Begin by translating the main source include fragment. This fragment is initially open.

---

FOR (TargetToken = each token in the target language virtual soucre) BEGIN
  SourceToken = the source token associated with the current TargetToken
  SourceFrag = Parent (SourceToken)

```
IF (IsOpen (Translation (SourceFrag)))
THE BEGIN
        /* add a new token to an existing fragment that is already
open */
        TargetFrag = Translation (Source Frag)
        Attach (TargetToken, TargetFrag)
END ELSE BEGIN
        /* create a new fragment, and add the new token to it */
        TargetFrag = Translate (SourceFrag)
        Attach (TargetToken, TargetFrag)
        SoucreInvSyntax = Parent (SourceFrag)
        TargetInvSyntax = Translate (SourceInvSyntax)
        Attach (TargetFrag, TargetInvSyntax)
        SourceFrag = Parent (SourceInvSyntax)
        /* Create new fragments and invocation syntax until
TargetToken is
                connected to the tree. */
        WHLE (NOT IsOpen (Translation (SourceFrag)) ) BEGIN
                TargetFrag = Translate (SoucreFrag)
                Attach (TaretInvSyntax, TargetFrag)
                SourceInvSyntax = Parent (SourceFrag)
                TargetInvSyntax = Translate (SourceInvSyntax)
                Attach (TargetFrag, TargetInvSyntax)
                SourceFrag = Parent (SourceInvSyntax)
        END WHILE
        TargetFrag = Translation (SourceFrag)
        Attach (TargetInvSyntax, TargetFrag);
END ELSE
END FOR
```

Figure 11:
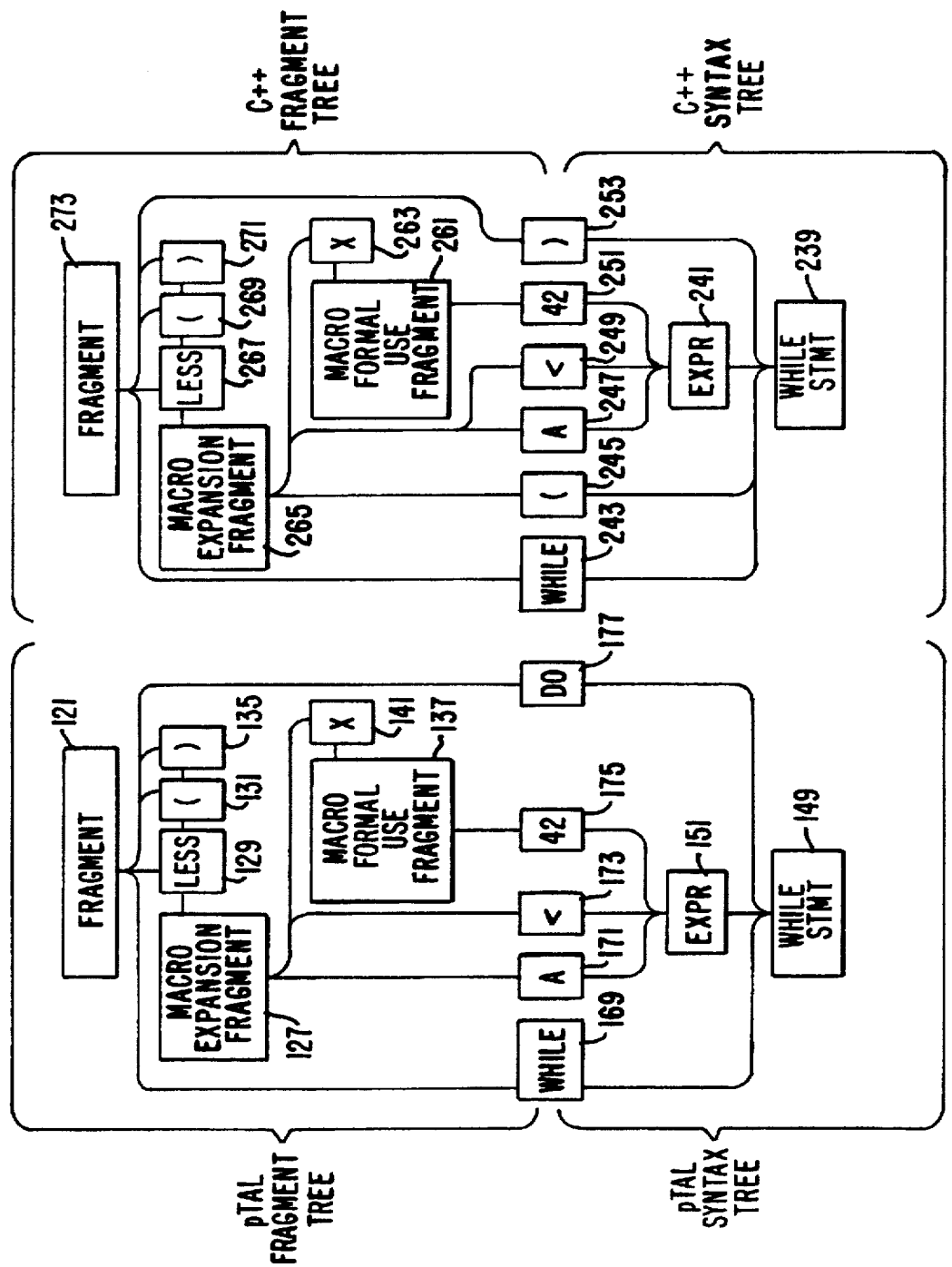
FIG. 11 depicts the source doubly-rooted tree and the target doubly-rooted tree introduced in FIG. 10, after the translation of the source fragment tree. All four trees are illustrated: the example pTAL source fragment tree and source syntax tree as well as semantically equivalent C++ target fragment tree and target syntax tree.

Taken together, FIGS. 9, 10, and 11 show an example of how the method of FIGS. 5, 6, 7, and 8 operates on a specific two line macro:

define less(x)=a<x#;
while less(42) do

The macro was written for a compiler of a Tandem proprietary high level language, pTAL. The target source code is a well known standardized language, C++. Correctly translated to C++, the macro reads:

define less(x)<x
while (a less(42))

FIG. 9 depicts an example fragment tree and syntax tree, using the pTAL language as the source language. This diagram represents an explosion of the pTAL syntax tree, pTAL fragment tree, and the pTAL tokens that connect them depicted in a more general way in FIG. 4: the source fragment tree 19, the source syntax tree 7, and leaves 9 that join them. The pTAL fragment tree and syntax tree is a doubly rooted tree jointed at the tokens. The tokens making up the body of the define "less" are represented in their context of use.

Fragment 121 represents the primary input file. Fragment 127 represents the invocation of the macro "less". Tokens 153, 155, 157, 159, 161, 163, 165, 167, 169, 129, 131, 135, and 177 are in fragment 127. The macro's invocation syntax 129, 131, 135 is associated with the fragment 127. The tokens 171, 173, and 141, which compose the macro body, are in fragment 127. Fragment 137 represents the substitution for macro formal parameter "x" of the actual parameter text, which is the token 175. The macro formal parameter's invocation syntax 141 is associated with the fragment 137. The token 175, which is the macro actual parameter, is in fragment 137.

Node 179 represents a pTAL procedure. That procedure is composed of a macro declaration represented by node 147 and a while statement represented by node 149. The macro declaration 147 contains the tokens 153, 155, 157, 159, 161, 163, 165, and 167. The body of the macro is expanded in its context of use. The while statement 149 is composed of the token 169, an expression represented by node 151, and the token 177. The expression 151 is composed of the tokens 171, 173, and 175.

FIG. 10 depicts a pTAL fragment subtree and syntax subtree, including the tokens that link them. It also depicts the C++ syntax tree that represents the translation of the pTAL syntax tree. The syntax translator has translated each pTAL syntactic construct to a semantically equivalent C++ syntactic construct. In addition, it maps pTAL tokens to C++ tokens. The pTAL fragment tree has not yet been translated to its C++ counterpart. The source language while statement 149 has been translated to the target language while statement 239. The source language expression 151 has been translated to the target language expression 241. Each C++ token in the C++ syntax tree 243, 245, 247, 249, 251, 253 was "generated" by exactly one pTAL token. C++ token 243 was generated by pTAL token 169, C++ token 245 was generated by pTAL token 171, and so on as depicted by dashed arrows. The association between a C++ token and a pTAL token, depicted as dashed arrows, determines in which virtual fragment the token belongs; these associations make it possible to build a target language fragment tree. One pTAL token may generate several C++ tokens: 169 generates 243, 245, and 253. One pTAL token may generate no C++ tokens: token 177 generates no C++ tokens. Each C++ token is generated by exactly one pTAL token.

FIG. 11 depicts a pTAL fragment tree and syntax tree, including the tokens that link them. It also depicts a semantically equivalent C++ fragment tree and syntax tree, including the tokens that link them. It depicts FIG. 11 after the translation of the fragment tree. In order to perform the translation, traverse the leaves of the C++ syntax tree; these leaves will become the leaves of the C++ fragment tree.

Following is a walkthrough of building the example C++ fragment subtree that is equivalent to the pTAL fragment subtree depicted in FIG. 10 and FIG. 11. A fragment in the C++ fragment tree is "open" if it is an ancestor of the leaf that was most recently added to the C++ fragment tree.

Translate the root of the pTAL fragment tree: the pTAL fragment 121 is translated to the C++ fragment 273. The C++ fragment tree root node 273 is initially "open".
Consider the C++ token 243.
  This token is associated with the pTAL token 169.
  The pTAL token 169 is contained in pTAL fragment 121, which translated to C++ fragment 273.
  C++ fragment 273 is "open".
  Add C++ token 243 to C++ fragment 273.
Consider the C++ token 245.
  This token is associated with the pTAL token 169.
  The pTAL token 169 is contained in pTAL fragment 121.
  pTAL fragment 121 translated to C++ fragment 273.
  C++ fragment 273 is "open".
  Add C++ token 245 to C++ fragment 273.
Consider the C++ token 247.
  This token is associated with the pTAL token 171.
  The pTAL token 171 is contained in pTAL fragment 127.
  The pTAL fragment 127 has not been translated, so does not appear in the C++ fragment tree.
  Translate the pTAL fragment 127 to create the C++ fragment 265.
  Add the C++ token 247 to the C++ fragment 265.
  The parent of the pTAL fragment 127 is the pTAL fragment 121.
  pTAL fragment 121 translated to the C++ fragment 273.
  C++ fragment 273 is "open" in the C++ fragment tree.
  Add the C++ fragment 265 to the C++ fragment 273.
Consider the C++ token 249.
  This token is associated with the pTAL token 173.
  The pTAL token 173 is contained in the pTAL fragment 127.

The pTAL fragment 127 translated to the C++ fragment 265.

The C++ fragment 265 is "open" in the C++ fragment tree.

Add the C++ token 249 to the C++ fragment 265. Consider the C++ token 251.

This token is associated with the pTAL token 175.

The pTAL token 175 is contained in the pTAL fragment 137.

The pTAL fragment 137 has not been translated, so does not appear in the C++ fragment tree.

Translate the pTAL fragment 137 to create the C++ fragment 261.

Add the C++ token 231 to the C++ fragment 261.

The parent of the pTAL fragment 137 is the pTAL fragment 127.

The pTAL fragment 127 was translated to the C++ fragment 265.

The C++ fragment 265 is "open" in the C++ fragment tree.

Add the C++ fragment 261 to the C++ fragment 265. Consider the C++ token 253.

This token is associated with the pTAL token 169.

The pTAL token 169 is contained in pTAL fragment 121, which translated to C++ fragment 273.

C++ fragment 273 is "open".

Add C++ token 253 to C++ fragment 273.

Notice that the C++ fragments 261 and 265 are no longer "open": they are no longer ancestors of the last C++ token to be added to the C++ fragment tree.

What is claimed is:

1. A method for use in a computer system for translating a first source code of a source computer language into a second source code of a target computer language, said method comprising:

creating a source doubly-rooted tree data structure, said creating including:
retrieving the first source code;
producing virtual source from the first source code to create a source fragment tree;
scanning the first source code to form a virtual source;
identifying the virtual source as leaves of the source doubly-rooted tree;
identifying leaves of the source fragment tree with the leaves of the source doubly-rooted tree;
parsing the virtual source into a source syntax tree such that the leaves of the source syntax tree are identified with the leaves of the source doubly-rooted tree; and
obtaining and storing semantic information completing a description of the source code in the source syntax tree;

creating a target doubly-rooted tree data structure including:
translating the source syntax tree and creating a target syntax tree;
identifying leaves of the target syntax tree with leaves of the target doubly-rooted tree;
associating leaves of the target doubly-rooted tree with corresponding leaves of the source doubly-rooted tree;
translating the source fragment tree and creating a target fragment tree so that leaves of the target fragment tree are ordered; and
identifying leaves of the target fragment tree with leaves of the target doubly-rooted tree;

generating the second source code from the target doubly-rooted tree; and storing the second source code.

2. The method of claim 1 wherein the step of translating the source fragment tree and creating a target fragment tree comprises:

locating the root of the source fragment tree; translating the source root to the root of the target fragment tree; and building the target fragment tree based on the position of leaves in the source fragment tree including the steps of:
locating a target fragment tree leaf;
examining a source fragment tree leaf associated with the target fragment tree leaf;
examining a parent node of the source fragment tree leaf;
firstly testing whether the most recent translation of the parent node is an ancestor of the most recently attached target fragment tree leaf or is the root of the target fragment tree;
attaching the target fragment tree leaf to the parent node of the most recently attached leaf; attaching the target fragment tree leaf to the parent node; and examining a next target fragment tree leaf, if any, if the first test result is TRUE;
translating the parent node; adding the parent node to the target fragment tree; attaching the target fragment tree leaf to the parent node; assigning the parent node to a first temporary object;
assigning a parent of the parent node to a second temporary object, if the first . test result is FALSE;
secondly testing whether the second temporary object is an ancestor of the most recently attached target fragment tree leaf or is the root of the target fragment tree, if the first test result is FALSE;
adding the second temporary object to the target fragment tree; attaching the first temporary object to the ancestor node; examining a next target fragment tree leaf, if any, if the first test result is FALSE and the second test result is TRUE; and
translating the second temporary object; attaching the second temporary object to the fragment tree; attaching the first temporary object to the second temporary object; assigning the second temporary object to the first temporary object; and continuing from said step of secondly testing, if the first test result is FALSE and the second test result is FALSE.

3. An apparatus for translating a first source code of a source computer language into a second source code of a target computer language while preserving text preprocessor statements and expressions comprising:

source computer language file means with memory allocated for storing the first source code;

target computer language file means with memory allocated for storing the second source code;

means for creating a first and second doubly-rooted tree data structures with memory allocated for information to be stored within the first and second data structures;

means for retrieving the first source code from memory;

means for scanning and parsing the first source code into a first virtual source;

means coupled to the scanning and parsing means for storing the first virtual source code while scanning and parsing in the first doubly-rooted tree data structure so that text preprocessor statements and expressions are preserved;

means for translating the first doubly-rooted tree structure into a second virtual source code;

means coupled to the translating means for storing the second virtual source code in the second doubly-rooted tree data structure so that text preprocessor statements and expressions are preserved;

means for traversing the second data structure coupled to means for creating the second source code;

means for storing the second source code coupled to the target computer language file means.

* * * * *